United States Patent Office 3,527,716
Patented Sept. 8, 1970

3,527,716
CATALYST SYSTEM AND A METHOD FOR THE PREPARATION OF UNSATURATED ACIDS AND ALDEHYDES
Joseph W. Nemec, Rydal, Pa., and Francis W. Schlaefer, Pennsauken, N.J., assignors to Rohm & Haas Company, Philadelphia, Pa., a corporation of Delaware
No Drawing. Continuation-in-part of application Ser. No. 555,247, June 6, 1966. This application Feb. 6, 1967, Ser. No. 615,880
Int. Cl. B01j 11/74
U.S. Cl. 252—439
11 Claims

ABSTRACT OF THE DISCLOSURE

The present invention relates to a novel catalyst system and a method for the preparation of olefinic oxidation products such as unsaturated acids and aldehydes. The novel catalyst system is formed of the fluxed product of cobalt molybdate with the telluride of arsenic, bismuth or antimony, or mixtures thereof. Use of the catalyst system results in high productivity of desired products over a prolonged period of operation, high selectivity over a prolonged period of operation and sharply enhanced physical stability over known catalyst systems. The catalyst system is preferably employed in the preparation of unsaturated aliphatic acids such as acrylic and methacrylic acids and unsaturated aldehydes such as acrolein and methacrolein by the oxidation of the appropriate olefin.

CROSS REFERENCES TO RELATED APPLICATIONS

This application is a continuation-in-part of U.S. application Ser. No. 555,247, filed June 6, 1966, now abandoned.

BACKGROUND OF THE INVENTION

This invention deals with a novel catalyst system. It further deals with a method for the preparation of a novel catalyst system. It also relates to an olefinic oxidation process for preparing unsaturated aliphatic acids such as acrylic acid and methacrylic acid and unsaturated aldehydes such as acrolein and methacrolein as well as other olefinic oxidation products.

Many attempts and many catalyst systems have been employed by the art to achieve conversion of propylene to acrolein, acrylic acid and acetic acid. The art indicates that the aforementioned conversion requires high temperatures and large volumes of gases. These conditions foster substantial costs in the construction and maintenance of reactors. Accordingly, for maximum commercial utility, it is imperative that productivity be maintained at a high level. Various degrees of success have been achieved by prior art systems by resorting to the use of high oxygen-propylene ratios, high reactor temperatures and various combinations of promoters and catalysts. The high ratios and temperatures favorably affect productivity per reactor volume but lead to increased waste gas formation. Also, promoters tend to be volatile and toxic, thereby requiring additional equipment for control and reuse. By and large, the known processes present the possibility and actual realization of increased waste gas formation, toxicity problems from the use of volatile promoters, expensive reactor construction and inefficient operation due to catalyst deterioration. The virtue of the present invention is that there is simultaneously provided a stable, efficient, selective, highly productive catalyst system.

SUMMARY OF THE INVENTION

The catalyst system of the present invention is prepared by fluxing cobalt molybdate of a specific particle size at defined temperatures, with the telluride of arsenic, bismuth or antimony, or mixtures thereof. By adhering rigidly to the teachings of this invention, one is able to provide consistently a novel catalyst system that is characterized by high productivity of desired products over a prolonged period of operation, high selectivity over a prolonged period of operation and sharply enhanced physical stability over known catalyst systems.

The novel catalyst system is employed in the preparation of unsaturated carboxylic acids and unsaturated aldehydes by the oxidation of an olefin. Acrolein and acrylic acid are prepared by the oxidation of propylene. Methacrolein and methacrylic acid are prepared by the oxidation of isobutylene.

The objects and advantages of the novel catalyst system are as follows:

(1) High productivity over a prolonged period

The examples following this section demonstrate that the acrylic acid productivity using the catalyst system of the present invention is substantially higher than that obtained with the cobalt molybdate alone. Furthermore, this high productivity is maintained even after extended periods of operation. This stability of production is particularly important in commercial operations where decreases in the acid content of the stream substantially reduce the efficiency of the equipment used to isolate the acids.

(2) High selectivity over a prolonged period

By employing the catalyst system of the present invention, one can increase acrylic acid productivity without being burdened by an increased rate of over-oxidation. This not only results in efficient use of the propylene, but also reduces the substantial heat load caused by the production of waste gas and acetic acid. The reactions resulting in the formation of the latter materials are significantly more exothermic than those leading to the formation of acrylic acid. Thus, when operating with the present invention, there is no need to accept minimal propylene conversions or to dilute the stream with increased amounts of water to remove the heat of reaction. This results in more efficient reactor utilization and also produces a higher concentration of desired acids in the reactor effluent. This enables the subsequent isolation of the acids to proceed with maximum efficiency.

(3) Prolonged physical stability

In the field of catalysis, physical stability normally refers to the ability of a catalyst to withstand pressure and abrasion. Such are encountered in heterogeneous catalytic reactors and cause less stable catalysts to crumble into smaller particles or fines. The occurrence of the latter is particularly undesirable in that they restrict gas flow through the reactor. Ultimately, a point is reached where the pressure drop is appreciable and flow becomes nearly impossible. The catalyst must then be replaced. Since commercial reactors normally contain a plurality of small diameter tubes, frequently several thousand or more, catalyst replacement is exceedingly time-consuming. In addition to the lack of productivity during shutdown, one must also bear the economic burden of synthesizing and charging fresh catalyst more frequently.

The prior art recognizes this problem and also discloses several methods for increasing physical stability. These include the use of supports and compression of the active ingredient to form tightly bonded pellets. Exploitation of these techniques results in improved physical stability but there is an accompanying decrease in productivity.

The catalyst system of the present invention simultaneously and significantly enhances both physical stability and productivity.

DETAILED DESCRIPTION OF THE INVENTION

In preparing the novel catalyst system the cobalt molybdate raw material is employed in a particle size of about 20 mesh to greater than 80 mesh, and up to 325 mesh or finer according to the following percentages:

From 0 to 20% of the cobalt molybdate, preferably 5 to 10%, is in the mesh range of 20 to 40;

From 40 to 60%, preferably 45 to 55%, is in the mesh range of 40 to 60;

From 10 to 35%, preferably 20 to 30%, is in the mesh range of 60 to 80; and

From 20 to 40%, preferably 22 to 30%, is in the mesh range of greater than 80, such as up to and including 325 mesh and finer material. A particularly advantageous range of cobalt molybdate comprises 50% of mesh range 40 to 60, 25% of mesh range 60 to 80 and 25% of mesh range greater than 80.

In order to realize simultaneously all of the valuable attributes of the present invention, one must incorporate, by fluxing, the cobalt molybdate with one or more of the tellurides of arsenic, bismuth and antimony, which may be represented by the formulas: $As_2Te_3$, $Bi_2Te_3$ and $Sb_2Te_3$, respectively. Usually, one would employ one of these tellurides in any particular catalyst system but it is quite possible to react mixtures of two or all three of these tellurides with the cobalt molybdate, as described hereinafter. The tellurides are employed in such a particle size that 75% is in the mesh range of 80 or greater. It is desirable to employ at least 90% of the telluride in the mesh range of 80 or greater and most advantageous to have all of the telluride in the mesh range of 80 or greater. The preferred telluride is that of bismuth.

The cobalt molybdate is mixed with the defined telluride or tellurides according to standard techniques. It is desirable, in order to provide a good distribution of the particles concerned, to form a slurry or paste by stirring the components in water. The slurry or paste can then be filtered, if desired, or centirfuged to reduce the amount of water but not dry the mixture of cobalt molybdate and selected telluride or tellurides. If filtration or centrifugation or other similar technique is employed it should be kept in mind that the mixture of components should, most advantageously, be kept in a paste form. The paste can then be processed through extrusion equipment in order to provide desired shapes of the catalyst system, such as pellets and the like. Alternatively, the catalyst system paste can be processed through known equipment to form tablets or the like. It is possible and within the skill of one familiar with the art to provide the catalyst system in any desired shape. In forming the slurry or paste, it is preferred to use distilled or deionized water in order to avoid the complexities of interfering metallic ions.

The pellets, tablets or the like must then be thermally treated or fluxed according to the following conditions of temperature, concentration and time to produce the unique catalyst of the present invention.

minuted form of such a particle size that substantially all of it passes through an 80 mesh screen. The copper telluride is normally mixed with the unpromoted catalyst system by any standard mixing procedure, such as tumbling or the like, and is readily adsorbed. The promotion step, if used, follows the fluxing step, described hereinbefore.

If desired, the novel catalyst system of this invention may be deposited on a support such as silica, clay, quartz, zirconia, alumina or Carborundum by employing standard techniques known in the art.

The catalyst system of this invention may be used to prepare various oxidation products of olefins such as unsaturated aldehydes and unsaturated acids. Representative olefins which may be used in the practice of this invention include propylene, butene-1, isobutylene, pentene-1, hexene-1, and octene-1. The catalyst system of this invention is more effective when the olefin is selected from the lower members of the aforementioned olefin series and is particularly efficient when the olefin is propylene or isobutylene, especially propylene.

Preferably the novel catalyst system is employed in the oxidative preparation of acrylic acid by the reaction of propylene, oxygen and water. This invention is conducted in a temperature range of about 350° C. to about 500° C. and the preferred range is from 400° C. to about 460° C. Atmospheric pressure or pressures somewhat above atmospheric, such as about 1 to about 40 atmospheres, may be used. Usually atmospheric pressure is employed.

Oxygen may be used as such in the reaction or may be supplied as air. It is desirable in this reaction to employ a diluent to facilitate control of this highly exothermic reaction. Therefore, if oxygen is employed as such, it is preferred to employ a gaseous diluent, such as carbon dioxide, nitrogen or the like. The carbon dioxide diluent is most economically provided from the carbon dioxide produced in the process. If oxygen is employed as the normal approximately 20% component of air, then nitrogen is already present as a useful diluent. Generally, the use of oxygen as a component of air is quite satisfactory for the purposes of this reaction.

The propylene is employed in a ratio with respect to oxygen of 1:0.2 to 1:2, preferably 1:08 to 1:1.2.

The ratio of water to propylene is about 1:1 to 10:1, preferably about 2:1 to 6:1. The contact time can range from 20 seconds to as low as 0.1 second, but about 0.5 to about 5 seconds is preferred. Longer contact times generally produce higher propylene conversions, but this is accompanied by an increase in waste gas formation. One skilled in the art may balance these two factors to obtain the contact time which results in the most economical operations.

Although the most preferred use of the novel catalyst system is for the oxidation of propylene to acrylic acid, isobutylene may be oxidized to methacrylic acid using the above described reaction parameters for the conver-

TABLE

| Telluride | Fluxing temperature, °C. | | | Concentration, weight percent telluride/ cobalt molybdate | | | Time (hours) | | |
|---|---|---|---|---|---|---|---|---|---|
| | Broadest | Preferred | Most effective | Broadest | Preferred | Most effective | Broadest | Preferred | Most effective |
| $As_2Te_3$ | 430–600 | 470–540 | 520–540 | 0.1–3.0 | 0.2–1.2 | 0.3–0.4 | 0.5–20 | 1.0–16 | 5–7 |
| $Bi_2Te_3$ | 430–600 | 470–540 | 470–490 | 0.1–4.0 | 0.3–1.8 | 0.5–0.6 | 0.5–20 | 0.5–16 | 5–7 |
| $Sb_2Te_3$ | 430–600 | 470–540 | 500–520 | 0.1–3.0 | 0.2–1.3 | 0.4–0.5 | 0.5–20 | 0.5–16 | 5–7 |

The catalyst system of the present invention may be used, as described hereinbefore, either promoted or not. If a promoted catalyst system is contemplated, it is preferred to use copper telluride, $Cu_2Te$, as the promoter.

The copper telluride promoter is employed in the range of about 0.10 to about 5.0%, preferably about 0.10 to about 1.0%, based on the weight of the unpromoted catalyst system. The copper telluride is employed in comsion of propylene to acrylic acid. However the most effective temperature range for the methacrylic acid reaction is about 360° C. to about 420° C.

Propylene may be oxidized to acrolein by using propylene, oxygen and water and following the reaction parameters for producing acrylic acid from propylene except that a lower temperature range is desirable for efficient operation. Preferably a temperature range of from about 350° C. to about 400° C. is employed. Likewise isobutylene may be conveted to methacrolein by employing the reaction parameters of the isobutylene to methacrylic acid conversion but using a lower temperature range, perferably 325 to 375° C.

To assist those skilled in the art to practice the present invention, the following modes of operation are suggested by way of illustration, ratios and percentages being by weight and the temperatures in ° C. unless otherwise specifically noted.

PREPARATION OF THE CATALYST BASE

An aqueous solution, prepared by dissolving 592 grams of cobaltous nitrate hexahydrate in 700 ml. of deionized water, previously warmed to 60° C., was added to another solution which was prepared from 354 grams of ammonium heptamolybdate and 500 ml. of deionized water, previously warmed to 75° C. The resulting solution was agitated and maintained at 48° to 50° C., while 320 ml. of aqueous 15% ammonia was added, dropwise, over a 30-minute period. After agitating for another 15 minutes, the slurry was suction filtered and the precipitate washed on the funnel with five one-liter portions of deionized water. The filter cake was then allowed to stand under one liter of deionized water for 72 hours. After removing the remaining water by filtration, the filter cake was reslurried with one liter of deionized water for one hour and filtered again. This filter cake was calcined for 32 hours in an electrically heated tube at 560° to 650° C. in the presence of a 6 liter/minute air stream.

The cobalt molybdate so obtained was crushed to 10/20 mesh.

IMPROVED PHYSICAL STABILITY AND HIGHER PRODUCTIVITY

Procedure A-1

The above cobalt molybdate was promoted with finely ground copper telluride in a ratio of 360 cc. of cobalt molybdate per one gram of copper telluride by tumbling the $Cu_2Te$, in a particle size that passes through an 80 mesh screen, with the cobalt molybdate.

The promoted catalyst was charged to a stainless steel tubular reactor, equipped with a preheater, and heated in a molten salt bath at 407° C. A gas stream having a propylene/air/water ratio of 1/4.6/4 was passed through the catalyst bed for 72 minutes. The contact time was 1.8 seconds. The propylene conversion was 23%, while the yields of acrylic acid, acetic acid, acrolein and waste gas were 27, 6.3, 55 and 12%, respectively. The acrylic acid productivity was 0.96 gram acrylic acid/ml. catalyst-day. The physical stability, expressed as the weight needed to crush a 1/8" x 1/8" cylinder, was 2.7 lbs.

Procedure A-2

The above cobalt molybdate was forced through a 40 mesh sieve, and the crushed material separated into 40/60, 60/80 and 80+ mesh particles. A mixture containing 150 grams of 40/60, 75 grams of 60/80 and 75 grams of 80+ mesh catalyst base was stirred for one hour with 225 ml. of deionized water and 1.67 grams of bismuth telluride, previously ground to 80+ mesh. After filtering the slurry, the filter cake was charged to a tubular calcining oven having a maximum temperature gradient of 20° C. The catalyst was heated to 470° to 490° C., in the presence of a six liter/minute air flow, and held there for seven hours. The heat-up period encompassed 2¾ hours. The finished catalyst was then crushed to 10/20 mesh, promoted with copper telluride and charged to the reactor in a manner similar to that described in Procedure A-1. Using a contact time of 1.8 seconds and a reactor temperature of 411° C., a feedstream, similar to that of Procedure A-1, was passed through the bed for 63 minutes. The propylene conversion was 31% and the yield of acrylic acid 27%. The yields of acetic acid, acrolein and waste gas were 4.8, 55 and 13%, respectively. The acrylic acid productivity increased to 1.14 grams acrylic acid/ml. catalyst-day, while the physical stability rose to 9.5 lbs.

Procedure A-3

A catalyst of this invention was synthesized by stirring 150 grams of 40/60, 75 grams of 60/80 and 75 grams of 80+ mesh cobalt molybdate with 225 ml. of deionized water and 1.07 grams of arsenic telluride for one hour. The slurry was then filtered and subsequently heated to 520° to 540° C. over a three-hour period and then held therefor an additional seven hours. The fluxing was conducted in the presence of a six liter-minute air stream.

The above catalyst was crushed to 10/20 mesh, promoted with copper telluride (as in Procedure A-1) and then charged to the reactor. Evaluation of the catalyst was conducted with a feedstream having a propylene/air/water ratio of 1/4.6/4 and a contact time of 1.8 seconds. The reactor temperature was 411° C. while the duration of the experiment was 60 minutes. The propylene conversion was 31% while the yields of acrylic acid, acetic acid, acrolein and waste gas were 28, 4.6, 58 and 10%, respectively. The acrylic acid productivity was 1.16 grams acrylic acid/ml. catalyst-day, while the physical stability measured 8.3 lbs.

Procedure A-4

This experiment consisted of stirring 150 grams of 40/60, 75 grams of 60/80 and 75 grams of 80+ mesh cobalt molybdate with 225 ml. of deionized water and 1.32 grams of antimony telluride for one hour. The slurry was filtered and the filter cake charged to the calciner. The calciner was brought to 470° to 540° C. over a three-hour period and held there for an additional five hours. The air flow rate through the calciner was held as six liters/minute.

The catalyst was crushed to 10/20 mesh, promoted with copper telluride, as in Procedure A-1, and charged to the reactor. The catalyst was heated to 440° C. whereupon a feedstream, similar to that described above in Procedure A-3, was passed through the bed for a period of 70 minutes. The contact time was 1.8 seconds, while the propylene conversion was 24%. The yields of acrylic acid, acetic acid, acrolein and waste gas were 34, 9.8, 30 and 25%, respectively. The productivity was 1.10 grams acrylic acid/ml. catalyst-day. The physical stability was 7.6 lbs.

Procedure A-5

A catalyst prepared by the method described in Procedure A-2 was heated to 410° C., whereupon a feedstream having a propylene/air/water ratio of 1/5/6 and a contact time of 2.5 seconds was passed through the bed for a period of 80 minutes. The yield and conversion values are substantially similar to Procedure A-2.

Procedure A-6

Procedure A-2 was repeated using a feedstream ratio of 5.9 carbon dioxide/2.1 water/1.1 oxygen/1.0 propylene. The reactor temperature was 454° C. and the contact time was 3.5 seconds. The duration of the experiment was 5.2 hours. The propylene conversion and yields corresponded to the values obtained from Procedure A-2.

Procedure A-7

By employing the catalyst and the same reaction parameters of Procedure A-2 except the reaction temperature is 375° C., the yield of acrolein was increased and little acrylic acid was obtained.

Procedure A-8

By following the procedures of Procedure A-2, but employing a reaction temperature of 390° C. and using isobutylene in lieu of propylene as the olefin, methacrylic acid is produced as well as some methacrolein. By using a reaction temperature of 350° C., selectivity to methacrolein results.

CRITICALITY OF FLUXING CONDITIONS

Procedure B-1

The cobalt molybdate-bismuth telluride catalyst, described in Procedure A-2, was heated to 440° C., while a gas stream having an air/propylene/water ratio of 1/4.6/4 was passed through the bed for a period of 60 minutes. The contact time was 1.8 seconds. The propylene conversion was 39%, while the yield of acrylic acid was 33%. The yields of acetic acid, acrolein and waste gas were 5.1, 40 and 22%, respectively. The catalyst productivity was 1.73 grams acrylic acid/ml. catalyst-day.

Procedure B-2

The cobalt molybdate-arsenic telluride catalyst of Procedure A-3 was heated to 450° C., while a feedstream containing propylene, air and water in the ratio of 1/4.6/4 was run through the bed for 60 minutes, the contact time being 1.8 seconds. The propylene conversion was 42%, while the yields of acrylic acid, acetic acid, acrolein and waste gas were 41, 6.5, 35 and 18%, respectively. Catalyst productivity was 2.31 grams acrylic acid/ml. catalyst-day.

Procedure B-3

A fluxed catalyst was synthesized in a manner identical to that of Procedure B-2, but the fluxing temperature was increased to 500° to 520° C. The finished catalyst was promoted with copper telluride and charged to the reactor. The reactor was heated to 440° C. and a feedstream having a propylene/air/water ratio of 1/4.6/4 was passed through the bed for a period of 60 minutes, the contact time being 1.8 seconds. The propylene conversion was 29%, while the yields of acrylic acid, acetic acid, acrolein and waste gas were 37, 7.1, 15 and 41%, respectively. The catalyst productivity fell to 1.45 grams acrylic acid/ml. catalyst-day, while the physical stability decreased to 5.0 lbs.

Procedure B-4

Another catalyst was synthesized in a manner identical to that of Procedure B-2, but the fluxing temperature was increased to 540° to 560° C. The promotion and reactor charge were also similar to that of Procedure B-2. A gas stream having a propylene/air/water ratio of 1/4.6/4 was passed through the catalyst bed for a period of 70 minutes. The contact time was 1.8 seconds, while the reactor temperature was 450° C. The propylene conversion was 27%, while the yields of acrylic acid, acetic acid, acrolein and waste gas were 21, 2.6, 64 and 13%, respectively. Catalyst productivity was 0.71 gram acrylic acid/ml. catalyst-day. The physical stability of this material was significantly less than of Procedure B-3.

Procedure B-5

The synthesis of this catalyst was also similar to that of Procedure B-2. The fluxing time period, however, was increased from 7 to 16 hours. The promotion and reactor charging procedures were both similar to those described in Procedure B-2. A feedstream having a ratio of propylene/air/water of 1/4.6/4 was passed through the bed for 60 minutes. The contact time and reactor temperature were 1.8 seconds and 441° C., respectively. The yields of acrylic acid, acetic acid, acrolein and waste gas were 13, 7.3, 57 and 23%, respectively. The propylene conversion was 29%, while the catalyst productivity and physical stability were 0.51 gram acrylic acid/ml. catalyst-day, and 7.5 lbs., respectily.

Procedure B-6

The synthesis procedure was similar to that of Example B-1, but the quantity of bismuth telluride in the slurry was increased from 1.67 grams to 5.01 grams. The procedures used for catalyst promotion and reactor charging were both identical to those of Procedure B-1. Using a contact time of 1.8 seconds, a feedstream having a propylene/air/water ratio of 1/4.6/4 was passed through the bed. The temperature of the latter was 459° C., while the duration of the experiment encompassed 61 minutes. The yield of acrylic acid was 20%, while the propylene conversion was 32%. The yields of acetic acid, acrolein and waste gas were 3.3, 57 and 20%, respectively. The catalyst productivity was 0.86 gram acrylic acid/ml. catalyst-day, while the physical stability measured 9.6 lbs.

EFFECT OF OPERATING CONDITIONS ON CATALYST PERFORMANCE

Procedure C-1

The catalyst bed, described in Procedure A-2, was heated to 450° C. and a feedstream having a propylene/air/water ratio of 1/4.6/4 was passed through the bed for a period of 180 minutes. The contact time was 0.8 second. The propylene conversion was 33%, while the yields of acrylic acid, acetic acid, acrolein and waste gas were 30, 3.1, 46 and 21%, respectively. The catalyst productivity was 2.92 grams acrylic acid/ml. catalyst-day.

Procedure C-2

A catalyst bed, similar to that described in Procedure A-3, was heated to 451° C. While employing a contact time of 0.8 second, a feedstream containing a propylene/air/water ratio of 1/4.6/4 was passed through the bed. The duration of the experiment was five hours. The propylene conversion was 28%, while the yields of acrylic acid, acetic acid, acrolein and waste gas were 36, 4.6, 46 and 14%, respectively. Catalyst productivity was 2.93 grams acrylic acid/ml. catalyst-day.

Procedure C-3

A catalyst was prepared in a manner similar to that described in Procedure A-3. However, the filter cake, prior to fluxing, was extruded into ⅛" strands. These were cut into ⅛" segments and then charged to the calciner. The fluxed extrusions were promoted as in Procedure A-3 and then charged to the reactor of a bench scale pilot plant. The latter included a unit which served to remove the acids from the stream and then recycled the acid-free effluent recycle gas back to the reactor. Before entering the reactor again, a small portion of the recycle stream was vented to maintain the system at a constant pressure. Fresh propylene and oxygen were added immediately before the recycle stream entered the preheater. This catalyst, after being used in acrylic acid production for over 50 hours, was heated to 430° C. and the oxygen and propylene feeds adjusted to produce a reactor input stream having a propylene/oxygen/water ratio of 1/0.72/4.1. The unit was operated at a steady state under these conditions for five hours. The yields of acrylic acid and acetic acid, based on the propylene fed, were 51 and 13%, respectively. The catalyst productivity was 1.94 grams acrylic acid/ml. catalyst-day, while the conversion of propylene, per pass, and the contact time were 28% and 1.8 seconds, respectively.

This catalyst, after being used in acrylic acid production for another 65 hours, was removed from the reactor. After a total of over 100 hours of operation, less than three volume per cent of the initial charge had degraded to fine material.

We claim:

1. A catalyst system of cobalt molybdate in the form of solid abrasion resistant and crush resistant particles fluxed by less than about 4% by weight of at least one telluride of arsenic, bismuth or antimony, the amounts being such that the selected telluride is present in an amount of between 0.1% and 3.0% for the arsenic telluride, between 0.1% and 4.0% for the bismuth telluride and between 0.1% and 3.0% for the antimony telluride, the amounts being based upon the combined weights of the cobalt molybdate and the telluride or tellurides.

2. A catalyst system according to claim 1 wherein said cobalt molybdate has a particle size in the range of about 20 mesh to greater than 80 mesh and said telluride has a particle size wherein 75% is in the mesh range of at least 80.

3. A catalyst system according to claim 1 wherein said cobalt molybdate is employed in a particle size according to the following:

0 to 20% in the mesh range of 20 to 40
40 to 60% in the mesh range of 40 to 60
10 to 35% in the mesh range of 60 to 80
20 to 40% in the mesh range greater than 80 wherein said telluride has a particle size wherein at least 90% is in the mesh range of at least 80.

4. A catalyst system according to claim 1 wherein said cobalt molybdate is employed in a particle size according to the following:

5 to 10% in the mesh range of 20 to 40
45 to 55% in the mesh range of 40 to 60
20 to 30% in the mesh range of 60 to 80
22 to 30% in the mesh range greater than 80 wherein said telluride has a particle size wherein substantially all of said telluride is in the mesh range of at least 80.

5. A catalyst system according to claim 1 wherein said telluride is that of bismuth.

6. A catalyst system according to claim 1 wherein said telluride is that of arsenic.

7. A catalyst system according to claim 1 wherein said system is promoted with 0.1–5% copper telluride.

8. A catalyst system according to claim 1 wherein said system is promoted with copper telluride employed in the range of about 0.10 to about 5.0% based on the weight of said cobalt molybdate.

9. A method for the preparation of the catalyst system of claim 1 wherein cobalt molybdate is fluxed with at least one telluride of arsenic, bismuth or antimony according to the following conditions:

| | Temperature, °C. | Weight percent | Time (hours) |
|---|---|---|---|
| $As_2Te_3$ | 430–600 | 0.1–3.0 | 0.5–20 |
| $Bi_2Te_3$ | 430–600 | 0.1–4.0 | 0.5–20 |
| $Sb_2Te_3$ | 430–600 | 0.1–3.0 | 0.5–20 |

10. A method for the preparation of the catalyst system of claim 9 wherein cobalt molybdate is fluxed with at least one telluride of arsenic, bismuth or antimony according to the following conditions:

| | Temperature, °C. | Weight percent | Time (hours) |
|---|---|---|---|
| $As_2Te_3$ | 470–540 | 0.2–1.2 | 1.0–16 |
| $Bi_2Te_3$ | 470–540 | 0.3–1.8 | 0.5–16 |
| $Sb_2Te_3$ | 470–540 | 0.2–1.3 | 0.5–16 |

11. A method for the preparation of the catalyst system of claim 9 wherein cobalt molybdate is fluxed with at least one telluride of arsenic, bismuth or antimony according to the following conditions:

| | Temperature, °C. | Weight percent | Time (hours) |
|---|---|---|---|
| $As_2Te_3$ | 520–540 | 0.3–0.4 | 5–7 |
| $Bi_2Te_3$ | 470–490 | 0.5–0.6 | 5–7 |
| $Sb_2Te_3$ | 500–520 | 0.4–0.5 | 5–7 |

References Cited

UNITED STATES PATENTS

| | | | |
|---|---|---|---|
| 3,009,943 | 11/1961 | Hadley et al. | 260—604 XR |
| 3,009,960 | 11/1961 | Shotts et al. | 260—604 |
| 3,098,102 | 7/1963 | Bethell et al. | 260—604 |
| 3,159,688 | 12/1964 | Jennings et al. | 252—439 XR |
| 3,177,257 | 4/1965 | Detling et al. | 260—604 |
| 3,240,806 | 3/1966 | Bethell et al. | 260—604 XR |

PATRICK P. GARVIN, Primary Examiner

U.S. Cl. X.R.

260—533, 604